Patented Apr. 18, 1933

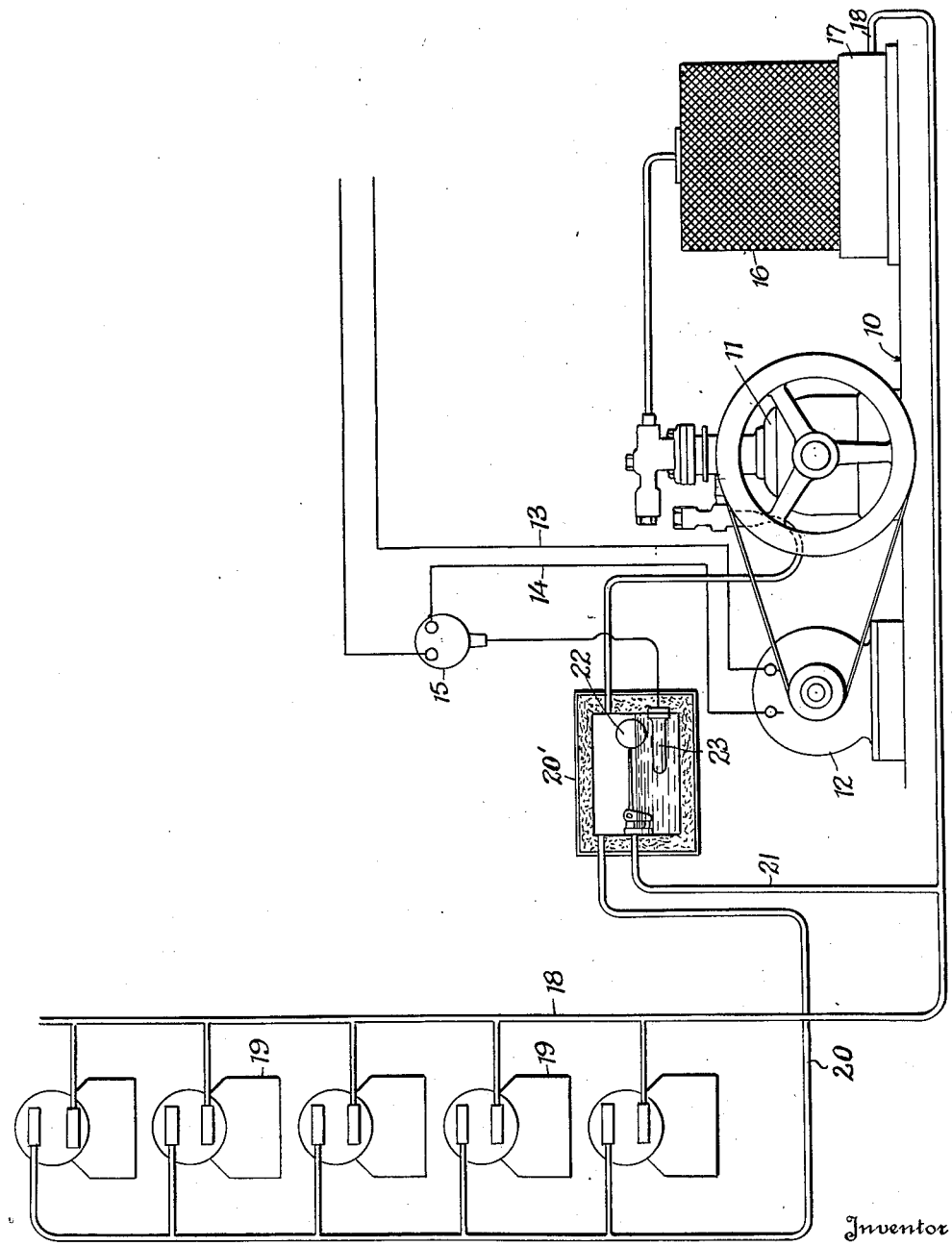

1,903,951

UNITED STATES PATENT OFFICE

EDWARD T. WILLIAMS, OF PELHAM MANOR, NEW YORK

TEMPERATURE CONTROL CHAMBER

Application filed May 7, 1930. Serial No. 450,338.

This invention relates to refrigeration and more particularly to a compression type multiple system wherein a motor operated compressor is operated intermittently for maintaining a temperature in the evaporators or chilling units within certain limits. More specifically the invention relates to a master temperature control chamber for controlling the operation of the machine which supplies refrigerant to the respective chilling units.

It is an object of the invention to provide a simple controlling means which may be mounted upon the base of the motor compressor unit or in close proximity thereto and which will operate to control the temperature in the remotely located compartments which are refrigerated, thus obviating the necessity and accompanying expense of running wires and the like from the motor to each individual chilling unit.

In the drawing:

The figure is a diagrammatic view illustrating one application of the invention.

Referring to the drawing, reference character 10 indicates the base of a conventional compression type refrigerating unit, the compressor being designated by the reference character 11 and the motor by the reference character 12. The compressor is driven by the motor 12 which receives its energy through conductors 13 and 14, the first of which is connected directly with the main line and the other being connected to a thermostatic switch 15, which is also connected to the main line. The refrigerating unit is also provided with a condenser 16 and a receiver 17 from which a liquid supply line extends to the respective evaporators or chilling units 19, and is connected in parallel with such units. A return or suction line 20 leads the refrigerant back to the compressor from such units 19.

In the suction line 20, adjacent the compressor, is inserted a master pressure control chamber 20′ which constitutes the essence of the present invention. The suction line communicates with the chamber adjacent the upper portion of the chamber. Substantially midway of the chamber below the connection 20 a connection 21 with the supply line 18 is provided for the purpose of supplying liquid refrigerant through the chamber 20′. A float 22 is employed for controlling the level or quantity of the refrigerant flowing into the chamber 20′ through the pipe 21, such float being on the low side. A thermostat 23 is located in the chamber below the normal liquid level maintained by the float so that the thermostat will be submerged by the liquid within the chamber or in effective thermal relation therewith. This thermostat is connected with the switch 15 for opening and closing the circuit according to the temperature of the liquid within the control chamber.

The evaporators or chilling units may be cooled by the employment of thermostatically controlled expansion valves or may be of the flooded type. However, this constitutes no part of the present invention and the employment of this type of device as well as other devices known in the art is contemplated by the present invention. The control chamber 20′ is insulated as shown in order that the temperature within the same will not be influenced appreciably by the outside temperature and in order that the pressure of the refrigerant returning through the suction line will control the temperature of the liquid refrigerant within the chamber.

In operation, the temperature of the liquid refrigerant in the chamber 20′ will vary with changes in the refrigerant vapor pressure above the liquid in said chamber and consequently the thermostat 23 will cause the operation of the switch 15 responsive to such temperature variation, a lowering of the temperature being adapted to open said switch and a rising temperature being adapted to close said switch. Since the cooling units are connected in parallel, the warming up of one or more of the cooling units will cause a change in the vapor pressure above the liquid in the chamber 20′ and a setting in operation of the motor which drives the compressor. In order therefore for the compressor to stop operating all of the cooling units must be at the proper temperature.

It will be obvious to those skilled in the art that various changes may be made without departing from the spirit of my invention and I therefore do not limit myself to what is shown in the drawings and described in the specification but only as set forth in the appended claims.

I claim:

1. In combination with a compression type refrigerator including an evaporator, means forming a control chamber in the suction line separate from the evaporator, means for supplying liquid to said chamber from the pressure line, a float for controlling the quantity of liquid in said chamber, a thermostat in said chamber below the normal liquid level, and a switch operated by the thermostat for controlling the operation of the refrigerator.

2. The combination of a chilling unit, a compressor for supplying compressed refrigerant to said chilling unit, a motor for operating said compressor, a pressure line for conveying the refrigerant from the compressor to the chilling unit, a suction line for returning refrigerant from the chilling unit to the compressor, a control chamber in the suction line, a connection between the pressure line and said chamber, a float for controlling the supply of refrigerant from the pressure line into the chamber for maintaining a normal liquid level in the chamber, a thermostat in the chamber below the normal liquid level, and a switch connected to and operated by said thermostat for controlling the operation of the motor.

3. A compression type multiple refrigerating system comprising a plurality of chilling units, a compressor, supply and return lines between the compressor and chilling units through which refrigerant is adapted to pass to the chilling units and from the chilling units back to the compressor, a motor for operating the compressor, a control chamber located adjacent the compressor in the return line, means within the control chamber for controlling the operation of the motor, said control chamber having a connection with the supply line through which refrigerant is adapted to be supplied to the chamber, and a float valve for controlling the supply of refrigerant to said chamber.

4. A compression type multiple refrigerating system comprising a plurality of chilling units, a compressor, supply and return lines between the compressor and chilling units through which refrigerant is adapted to pass to the chilling units and from the chilling units back to the compressor, a motor for operating the compressor, a control chamber located adjacent the compressor in the return line, means within the control chamber for controlling the operation of the motor, said control chamber having a connection with the supply line through which refrigerant is adapted to be supplied to the chamber, a float valve for controlling the supply of refrigerant to said chamber, and a temperature responsive device located below the liquid level in said chamber and adapted to be submerged by liquid therein for controlling the operation of the motor.

5. In combination in a refrigerating system comprising condensing means, evaporating means, a suction line connecting said condensing and evaporating means; a control chamber in the suction line, means for controlling the quantity of liquid refrigerant in said control chamber, means for independently supplying liquid refrigerant from said condensing means to said chamber and said evaporating means, and thermostatic means adapted to be influenced by temperature changes of the liquid within the chamber for controlling the operation of the refrigerator.

6. In combination with a compression type refrigerator comprising evaporating means and a suction line; a control chamber in the suction line, means for independently supplying liquid refrigerant to said control chamber and said evaporating means, means for controlling the quantity of liquid refrigerant in said control chamber, thermostatic means in heat exchange relation with and adapted to be influenced by temperature changes of the liquid refrigerant in said chamber, and a switch operated by the thermostat for controlling the operation of the compressor.

7. In combination with a compression type refrigerator including a compressor, an evaporator having means for controlling the supply of refrigerant thereto, and suction and pressure lines connecting the compressor with the evaporator, a control chamber in the suction line independent of the evaporating means, a connection from the pressure line for admitting liquid to said control chamber, means for controlling the quantity of liquid in said chamber, and a thermostat adapted to be influenced by temperature changes of the liquid within the chamber for controlling the operation of the compressor.

8. In a refrigerating system a plurality of evaporators, a control chamber, means for conducting vapor from said evaporators to said control chamber, means for supplying cooling fluid to said evaporators and said chamber, and means for returning vapor to the fluid supplying means.

In testimony whereof I affix my signature.
EDWARD T. WILLIAMS.